United States Patent [19]

Monjes

[11] 4,345,586
[45] Aug. 24, 1982

[54] CASCADE SOLAR HEATER

[76] Inventor: Julio A. Monjes, 2858 Via Cordoba, San Roman, Calif. 94583

[21] Appl. No.: 118,738

[22] Filed: Feb. 5, 1980

[51] Int. Cl.³ .................................................. F24J 3/02
[52] U.S. Cl. .................................... 126/449; 126/444
[58] Field of Search ............... 126/445, 449, 439, 444, 126/450, 417, 421, 435

[56] References Cited

U.S. PATENT DOCUMENTS

| 102,633 | 5/1870 | Wheeler | 126/417 |
| 4,003,364 | 1/1977 | Balkus | 126/438 |
| 4,180,057 | 12/1979 | Ward | 126/449 |

FOREIGN PATENT DOCUMENTS 2827708 1/1979 Fed. Rep. of Germany ...... 126/439

Primary Examiner—Carroll B. Dority, Jr.
Assistant Examiner—G. Anderson
Attorney, Agent, or Firm—Henry P. Sartorio

[57] ABSTRACT

A cascade solar fluid heater, with optional cross flow, provides direct solar heating of fluids using total internal reflection at the fluid free surface to trap radiation and enhance absorption. A highly absorbing material is formed into a continuous cascade or waterfall arrangement of collecting channels down which the fluid flows. Absorption of incident radiant enery is improved by designing the channels so that reflected radiation is totally internally reflected at the free surface of the fluid so that the radiation impinges again on the absorbing surface. The angle of the collection surface is determined as a function of the angle of incidence, and optimum performance is provided for any angle of incidence less than the selected design value. The system can be designed optionally for any geographical latitude.

5 Claims, 10 Drawing Figures

CASCADE SOLAR HEATER

BACKGROUND OF THE INVENTION

The invention relates to solar fluid heating systems and more particularly to a solar fluid heating system of series cascade design for direct solar energy heating of fluids using total internal reflection to trap radiation in the fluid, thereby enhancing the absorption.

The energy situation in the United States and throughout the world is becoming extremely critical. Fossil fuels are in short supply and have become extremely expensive. The supply of oil is greatly affected by the frequently volatile world political situation. Nuclear power has reached a stalemate because of safety concerns and the waste disposal problem. Furthermore, nuclear fuel may soon be critically in short supply. Advanced technologies such as fusion energy cannot be developed soon enough to meet the current energy crisis. The United States has set a major policy goal of reducing energy consumption, particularly oil, in order to break the dependency on foreign supplies.

The sun is a universally available and abundant source of energy which is largely untapped. Advanced solar energy technology such as photovoltaic cells and large scale energy converters may require long-term development. However, solar fluid heating systems designed for individual homes can result in significant energy savings by being used to provide hot water or to heat swimming pools or even to heat the home. Many rooftop systems for gathering solar energy have already been developed.

U.S. Pat. No. 4,047,518 to Anderson shows a solar heating system in which heat is absorbed by a black material suspended in the liquid. The black heat absorbing liquid exchanges its heat content to another liquid through a heat exchanger.

U.S. Pat. No. 4,142,513 to Auger shows a solar heater with a gravity driven flow in which a fluid is heated between two black, thin films.

U.S. Pat. No. 3,991,742 to Gerber discloses a solar heating system in which a fluid is heated between two thin, flat plates, with a corrugated or mesh spreader being used to equalize the fluid flow.

U.S. Pat. No. 4,076,015 to Mattson shows a solar energy collector with a combination of reflecting and transmitting surfaces to increase collection efficiency.

U.S. Pat. No. 4,111,186 to Ross et al. shows a flat plat solar collector having a pack of plastic bubbles with the fluid circulating around the bubbles.

U.S. Pat. No. 4,019,496 to Cummings describes a solar collector having a plurality of fins which form radiation traps. The fins do not contact the fluid which circulates in pipes below the fins.

U.S. Pat. No. 4,154,220 to Loth describes a flat plate solar collector having fins for heating air which circulates around the fins. U.S. Pat. No. 4,079,724 to Zwillinger shows a solar collector with fins of complex geometry forming a radiation trap to heat gas that circulates between the fins or fluid that circulates in structural pipes supporting the fins.

Some disadvantages of the prior art are the complexity of the designs, with a corresponding high cost, and the lower efficiency, caused in part by the loss of incident energy at the absorbing surface because of reflections. The prior art does not provide a system whose performance can be optimized for a particular geographical location by the selection of a simple design parameter.

It is an object of the invention to provide a solar fluid heating system with enhanced collection efficiency over an extended range of geographical latitudes.

It is also an object of the invention to provide a solar fluid heating system with maximum heat absorption capability.

It is a further object of the invention to provide a solar fluid heating system in which radiation is trapped in the fluid to produce maximum heating.

It is also an object of the invention to provide a solar fluid heating system in which the maximum efficiency at a given latitude is independent of the angle at which the heating system is mounted or installed.

It is another object of the invention to provide a solar fluid heating system of simplified construction and low cost.

It is another object of the invention to provide a solar fluid heating system which can provide heated fluid through two independent flow systems.

Additional objects, novel features, and advantages will become apparent from the following specification with accompanying drawings, and appended claims.

SUMMARY OF THE INVENTION

The invention is a cascade solar heating system with direct solar energy heating of fluids using total internal reflection at the free surface of the fluid to trap radiation in the fluid, thereby enhancing absorption. The cascade solar heater is constructed as a solar heater panel with a multiple cascade or staircase arrangement of collector channels mounted to a backing plate. The panel is covered by a transparent material to form a closed unit to prevent loss of fluid by evaporation and loss of heat by convection. The panel is mounted on a slope, such as a roof, exposed to the sun to heat a fluid such as water for use in a swimming pool or in the home. Basic fluid flow is down the multiple cascade or waterfall arrangement or collector channels. The cascade flow originates at a feed pipe located along the high edge of the panel. The water flows down, filling successive channels and overflowing into the next, until reaching the collection line at the bottom edge. A series of collecting channels is formed from a highly absorbing material. The rate of fluid flow is slow enough so that most of the fluid remains in the collecting channels for a sufficient time to be heated by contact with the highly absorbing material forming the collecting channels.

The absorption of incident radiant energy is improved by an optical method using total internal reflection. The key feature of the invention is the design of the collecting channels to promote total internal reflection at the free surface of the fluid. A large fraction of the incident energy is absorbed by the channel material and heats the fluid flowing in a cascade down successive channels; however, a fraction of the incident energy is reflected by the channel material. The channel is designed so that when this reflected radiation reaches the free surface it is totally internally reflected at the free surface of the fluid so that it impinges again on the channel material thereby increasing absorption and heating. The slope angle of the collecting channel surface is selected, independent of the roof slope, so that for any preselected angle of incidence, which is determined by the latitude, time of day and time of year, or any smaller angle, the incident ray that is reflected from the collecting channel surface is totally internally reflected at the fluid free surface. Thus the fraction of energy that is not absorbed when incident energy initially impinges on the collecting surface, is absorbed in successive impingements so that the absorption efficiency of the collector is increased. This system is designed for a particular value $I_o$, and total internal reflection will occur for all incident angles less than $I_o$. The effect of the multiple reflections is to greatly increase the collector efficiency. If the absorption of the surface is 80%, then less than 1% is lost with three reflections, as generally occur according to the design of the invention. Therefore the absorption efficiency is increased from 80% to better than 99%.

Also, embodiments of the invention are adapted for geographical locations where a high pitch roof is necessary. In one configuration the panel surface has a vertical segment. For the situation where the slope angle of the collecting surface is the same as the roof slope, a simplified design with a flat surface and vertical fins is utilized.

An optional cross flow can be included in the cascade solar heating system. The second flow can be included in the system by flowing water in the direction of the channels underneath the channel collecting material in the spaces between each channel and the backing plate to which the channels are mounted. Thus a second independent flow system can be added utilizing the same components as the single cascade flow system. If one of the fluids is not being circulated, that fluid becomes a heat reservoir which automatically transfer its heat content to the flow which is being utilized.

DETAILED DESCRIPTION OF THE PREFERRED EMBODIMENT

Figure 1:
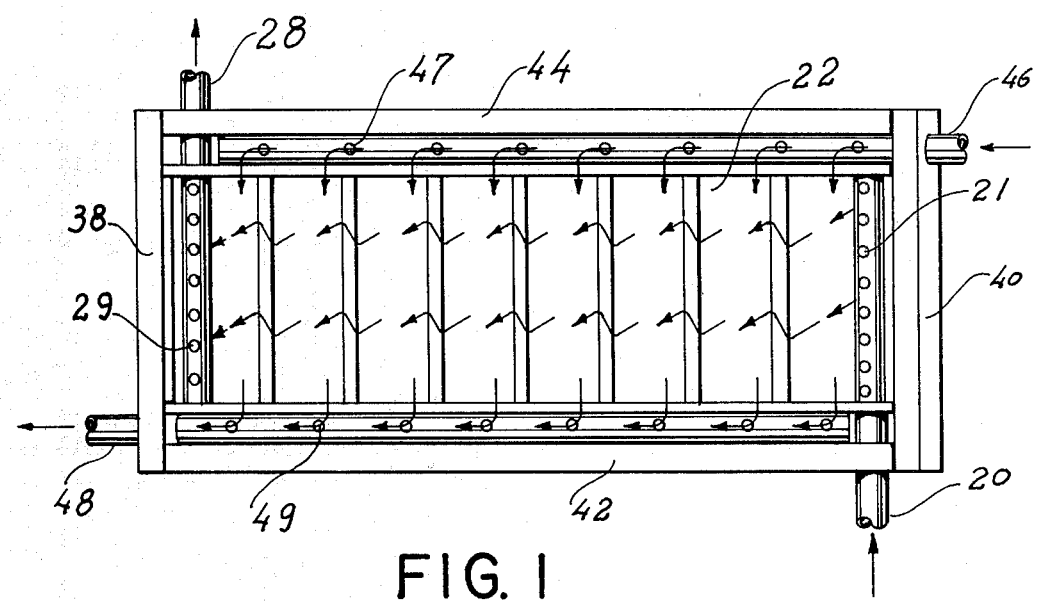
FIG. 1 is a top plan view of the cascade solar fluid heater.
Figure 2:
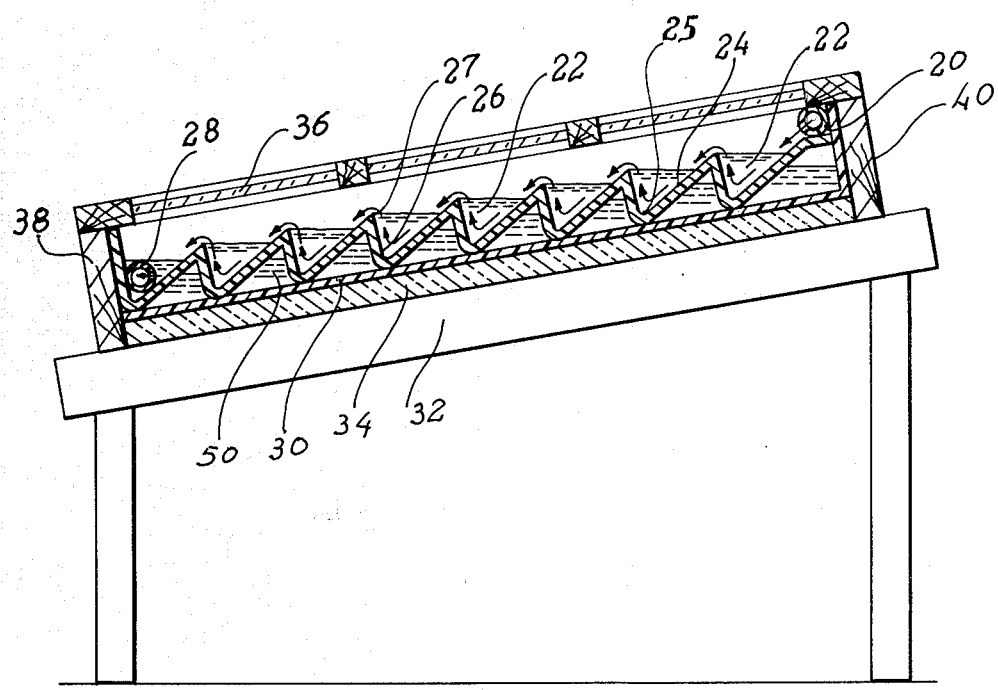
FIG. 2 is a side elevational cross-sectional view of the cascade solar fluid heater.

The invention is a series cascade solar fluid heater for direct solar energy heating of fluids using total internal reflection on the free surface of the fluid to trap radiation in the transparent fluid to increase energy absorption. The basic design of the solar heater, as shown in FIGS. 1 and 2, is a multiple cascade or staircase of collecting channels 22 providing a continuous waterfall of fluid. Water or other fluid is introduced at the top of the cascade through holes 21 in feed pipe 20. The water or other fluid flows into the first of a connected series of collecting channels 22 which are made up of collection surface 24 and rising surface 26 which join together at junction 25. The collection surface 24 is preferably longer than the rising surface 26 and is generally disposed to receive most of the incident radiant energy. The slope of the collection surfaces 24 is constant and is selected to promote total internal reflection at the free surface of the fluid in the channel. The top of rising surface 26 is spilling edge 27 where the next successive channel is joined to the preceding channel. The series of collecting channels 22 is preferably made from a continuous sheet of highly absorbing material such as PVC or other dark color plastic. As water fills each channel it overflows over the spilling edge 27 into the next successive collecting channel 22 until the whole series of collecting channels are filled with water and a steady state flow is established. The difference in height between cascades is preferably such that fluid flow is laminar. The water which reaches the lower end of the cascade is removed through holes 29 in output pipe 28.

The continuous cascade of collecting channels 22 are mounted to a backing plate 30 which is mounted on a roof 32 separated by a layer of insulation 34. The series of channels is further enclosed by a transparent cover 36 and sides 38, 40, 42 and 44, to form a closed unit to prevent loss of water or other fluid by evaporation and loss of heat by convection. The cover 36 also increases efficiency by reducing wind cooling and creating a greenhouse effect on the cascade solar heating panel. The transparent cover 36 allows sunlight to impinge on the collecting channels 22. The material forming the collecting channels 22 absorbs a large fraction of the incident solar energy, becoming hot and thereby heating the pool of water in the collecting channel. The rate of flow is generally slow so that most of the water remains in pools in the collecting channels until it is sufficiently heated. The flow system is a gravity flow system by which the water descends from the high point to the low point of the cascade assembly. Thus the slope of the roof 32, or other mounting slope of the panel, affects the flow rate. The channel material, such as PVC, is of minimum thickness sufficient to provide adequate structural strength, thereby providing low cost and ease of construction. A thickness of 1/32 inch may be sufficient.

An optional second flow system can be incorporated into the cascade flow system. Water or other fluid is introduced through holes 47 in cross flow feed pipe 46 which runs down along one side of the cascade flow system. The water flows perpendicular to the cascade flow in the spaces 50 under each collecting channel between the collecting channels 22 and the backing plate 30 and is removed through holes 49 in cross flow output pipe 48 running down along the opposite side of the cascade assembly. The water flowing underneath the collecting channels is also heated by the highly absorbing collecting channel material when it absorbs incident solar radiation.

Figure 3:
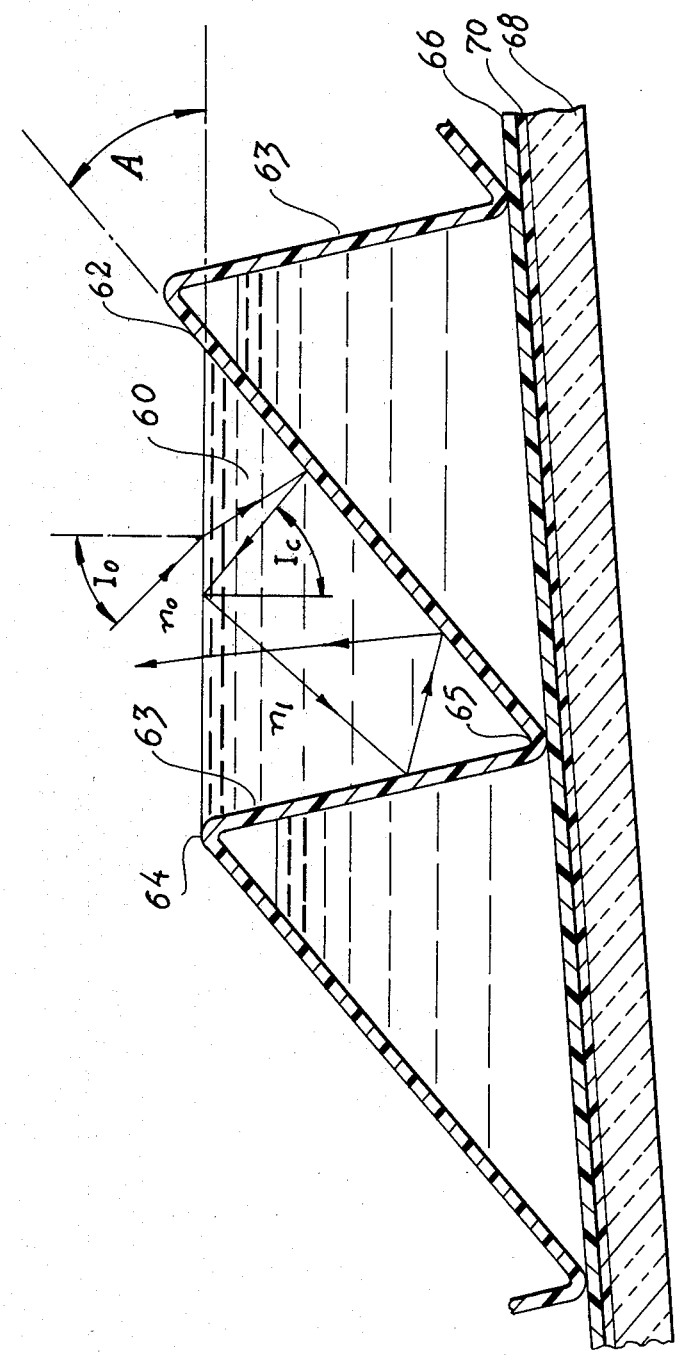
FIG. 3 shows the design of the collecting channels of the solar fluid heater, illustrating the total internal reflection technique for enhancing absorption when the incident angle is at the maximum design value.

An optical technique is used to trap radiation in a transparent fluid medium in order to increase absorption of incident energy by the collecting channel material. The technique is to promote total internal reflection on the free surface of the fluid as shown in FIG. 3. The condition for total internal reflection to occur is $$\sin I_c \geq (n_o/n_1)$$

where $n_o$ is the index of refraction of air, $n_1$ is the index of refraction of the fluid and $I_c$ is the critical internal incidence angle. A collecting channel 60 made up of collection surface 62 joined at junction 65 to rising surface 63 having a top spilling edge 64 is filled with water or other fluid. The collecting channel 60 is mounted on backing plate 66 which is mounted on a roof or other structure. A layer of reflective insulation 70 plus a layer of resistive insulation 68 are placed between the backing plate 66 and the roof or other structure (not shown). An incident ray of light, incident at angle $I_o$, is refracted when it transverses the fluid surface and impinges on the collection surface 62. Little of the incident energy is absorbed directly in the fluid and will be ignored. A fraction f of the incident energy is absorbed by the collection surface 62 and the remaining fraction $1-f$ is reflected back. The absorbed energy is transformed into heat which is transferred to the mass of the fluid collected in the collecting channel 60. The back reflected fraction of energy hits the free surface of the fluid where at the proper angle it is totally internally reflected back into the fluid rather than being refracted out to the atmosphere. The totally internally reflected ray impinges on the rising surface 63 where again a fraction f is absorbed and a fraction $1-f$ is reflected towards the collection surface 62. Again at the collection surface 62 a fraction f is absorbed and a fraction $1-f$ is reflected out to the atmosphere. Thus by producing a total internal reflection of the first back-reflected ray the incident ray has been made to impinge three times on the collecting channel surface before being reflected back out to the atmosphere. The amount of energy absorbed has been greatly increased while the amount lost by reflection has been decreased from the fraction $1-f$ to the fraction $(1-f)^3$. For a typical value $f=0.8$, the loss has been decreased from 20% to 0.8%, or the absorption has been increased from 80% to better than 99%.

Figure 4:
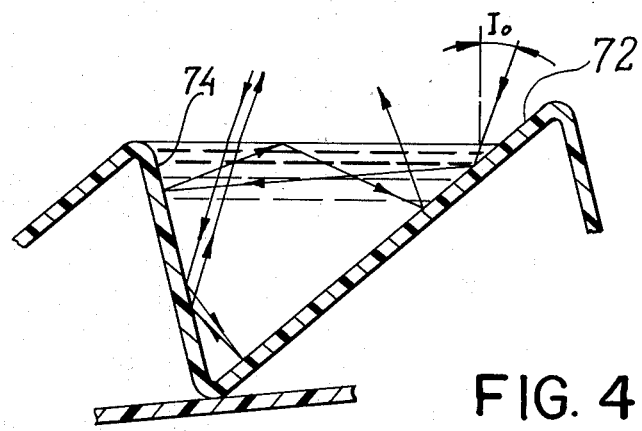
FIG. 4 shows the collecting channel illustrating the total internal reflection technique when the incident angle has a negative value (beyond the vertical)
Figure 5:
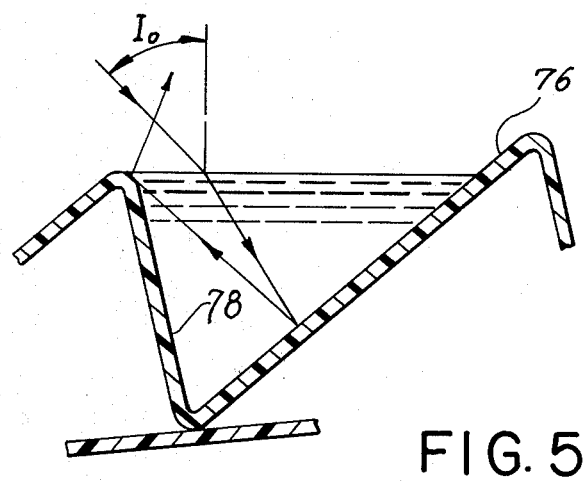
FIG. 5 shows the ray path in the collecting channel when the second reflection of the ray strikes the rising surface of the channel and is reflected out without total internal reflection.

The condition for a ray incident at $I_o$ to be totally internally reflected at the free surface of the fluid is that the slope angle A of collection surface 62 be given by $$A = \tfrac{1}{2}[\sin^{-1}(\sin I_o/n_1) + \sin^{-1}(n_o/n_1)]$$

where $n_o$ is the index of refraction of air and $n_1$ is the index of refraction of water or the other fluid. If the condition is fulfilled for a given value of $I_o$, measured in the plane of incidence, then it will be fulfilled for all angles of incidence less than $I_o$. Therefore a cascade solar heater with a slope angle A chosen for a certain angle of incidence will be equally or more effective in trapping radiation at lower angles of incidence. The design angle of incidence of sunlight at a particular geographical location can be determined by the latitude and by the time of year and time of day desired to start operation of the heater. Accordingly, for a particular location a cascade solar heater according to the invention can be designed for such maximum value of $I_o$ or any other desired $I_o$ and the heater will then operate at maximum efficiency for the remainder of the year during which the angle of incidence is less than the chosen $I_o$. Even when the angle of incidence is a negative angle as shown in FIG. 4 in which the rays have passed beyond the vertical or zero incidence value, maximum absorption is obtained. A ray striking the collection surface 72 is reflected to strike the rising surface 74 from which it is reflected to the fluid surface where total internal reflection occurs and the ray impinges on collection surface 72 again providing three reflections within the volume. A ray that strikes rising surface 74 directly is reflected to strike collection surface 72 and then back again onto surface 74 so that three reflections also occur. For some values of the incidence angle close to the maximum only two reflections will occur over a small portion of the collector surface, as shown in FIG. 5. The rays striking collection surface 76 are reflected to impinge on rising surface 78 from which they are reflected back to the atmosphere. However, the energy loss has still been reduced from the fraction $1-f$ to the fraction $(1-f)^2$. By making the angle of rising surface 78 parallel to the maximum incidence angle $I_o$ this effect can be minimized.

The following calculation illustrates the application of the invention to the design of a heater for a latitude of 37°27' (San Francisco). From known astronomical data, the ecliptic angle of the earth is 23°27'. At noon time on June 21, the angle of incidence is a minimum, $I_{min}$=latitude−ecliptic angle=14°. At the Equinoxes, March 21 and September 21, the incidence angle at noon is the same as the latitude. The heater is, by choice, designed to achieve maximum efficiency on April 21. The variation of the incidence angle in the two months before June 21 can be calculated as the prorata portion of the change between March 31 and June 21, or $dI = (\tfrac{2}{3})(37°27' - 14°) = 16°$, so the maximum incidence angle at noon time at the starting (and ending) day is $I_{max} = I_{min} + dI = 30°$.

The heater is also designed, by choice, to provide maximum efficiency for a period of 4 hrs/day around noon time, or from 10:00 AM to 2:00 PM. The starting (and ending) incidence angle over this period is given by $I_{st} = I_{max} + PR$ where $I_{max}$ is the angle at noon, P is one-half the period of maximum efficiency, and $R = 15°/hr$ is the sun diurnal rate. For $I_{max}=30°$ and $P=2$ hrs, $I_{st}=60°$. The channel slope A is calculated using the formula with $I_o = I_{st} = 60°$, $n_o = 1$ (refractive index of air), $n_1 = 1.33$ (refractive index of water). The slope angle is $A=45°$. The angle $I_{st}$ is the maximum incidence angle at the beginning and ending hours (10 AM and 2 PM) on the first and last day chosen for the season of maximum efficiency, April 21 and August 21. As the day progresses toward noon, the angle of incidence decreases so the condition for total internal reflection continues to be fulfilled. As the year progresses toward June 21, the daily period of maximum efficiency increases since the chosen angle of incidence $I_{st}$ is reached earlier (and later) in the day. On June 21 with $I_{st}=60°$ and $I_{max}=14°$, P=3 hrs, so the maximum efficiency is obtained for 6 hrs/day in the middle of the season as compared to 4 hrs/day at the beginning and end of the season. Any other day and hour at any particular latitude could be chosen. Even before April 21 and after August 21, the heater will operate at maximum efficiency, but for a shorter period.

To complete the design and construction, a conventional flow calculation, as shown in Raymond C. Binder, Fluid Mechanics, Ch. 12, can be performed to obtain the slope of the panel desired. For a flow rate of 60 gpm and a friction or retarding coefficient for a cascade of 15 times that for a flat plate, a panel slope of 7° is obtained. Thus in constructing the panel, the angle between the sloped surface 62 and backing plate 66 should be 45°−7°=38°.

Figure 6:
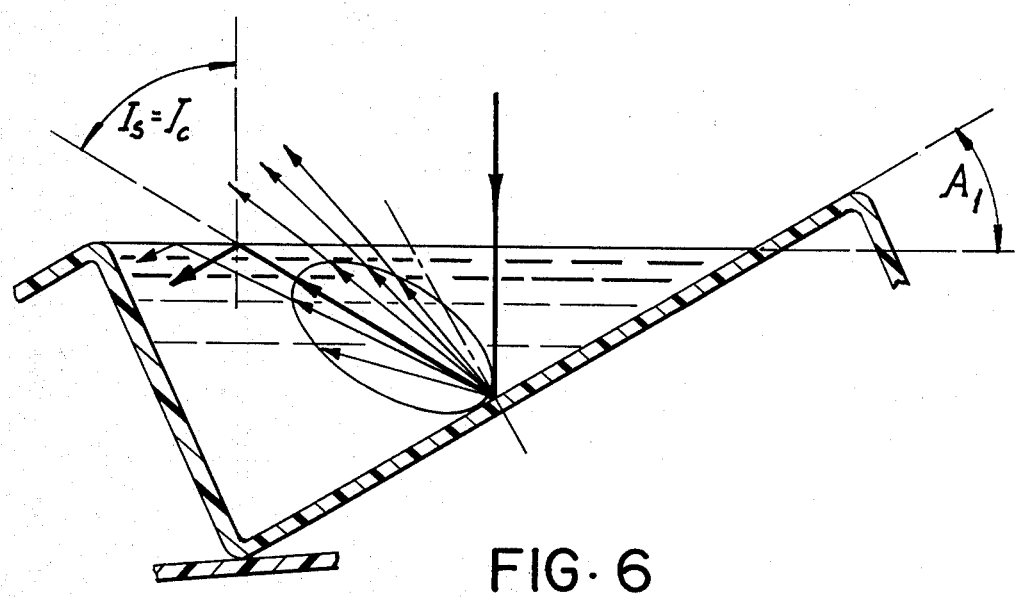
FIG. 6 shows a graphical representation of the non-specular reflection from a typical surface finish of the collecting channel.
Figure 7:
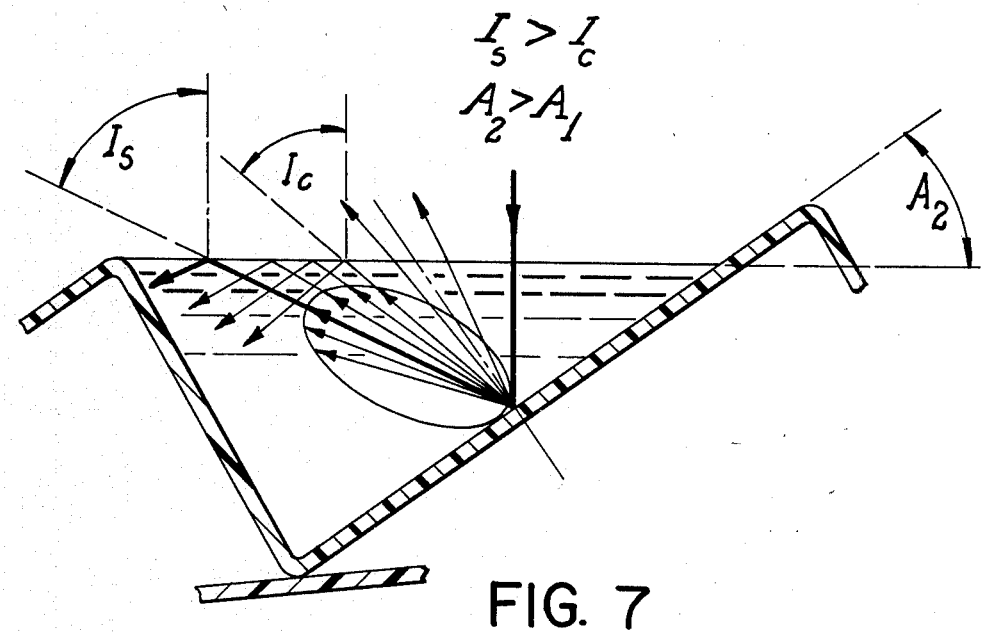
FIG. 7 shows the improvement in the amount of energy back reflected with non-specular reflection as a result of increasing the angle of the collecting surface.

An additional geometric degradation factor that lowers collector efficiency is that the reflections from the surfaces are not 100% specular but will be distributed along a continuous variation of directions as illustrated in FIGS. 6 and 7. Rays are reflected over a continuous distribution of directions with decreasing intensity as the direction departs from the specular direction. The degree of departure from the single direction of the specular reflection $I_s$ is related to the small scale roughness of the reflecting surface. In contrast the degree of absorption of energy by the surface is related and can be controlled mainly by the transparency and the color of the reflecting surface, with black being the most absorbant color. As shown in FIG. 6 the fraction of radiant energy reflected at an angle greater than the specular direction $I_s = I_c$ will fulfill the total internal reflection condition while the fraction reflected at an angle smaller than the specular direction will be lost to the atmosphere. However, the amount of energy back reflected by total internal reflection can be increased by increasing the angle $A_1$ to a greater value $A_2$ such that $I_s > I_c$, thereby increasing the angle of internal incidence on the free surface such that the condition for total internal reflection is fulfilled for a larger fraction of the diffused radiation and therefore decreasing the amount of energy lost through the free surface, as shown in FIG. 7.

Figure 8:
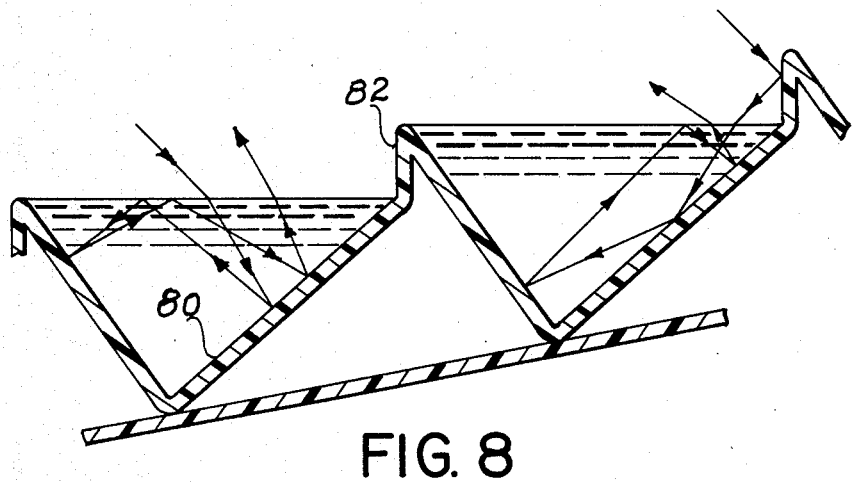
FIG. 8 shows the collecting channel design for use at high latitudes on a roof with a steep slope.

Optional embodiments of the invention are designed for high geographical latitudes where the incidence angle $I_o$ is very large or for use on a high pitched roof. In the embodiment shown in FIG. 8 the collection surface 80 of the collecting channel is connected to a vertical surface 82. Rays striking the vertical surface 82 are partly absorbed and partly reflected into the collecting channel so that the same total internal reflection and successive absorption occur.

Figure 9:
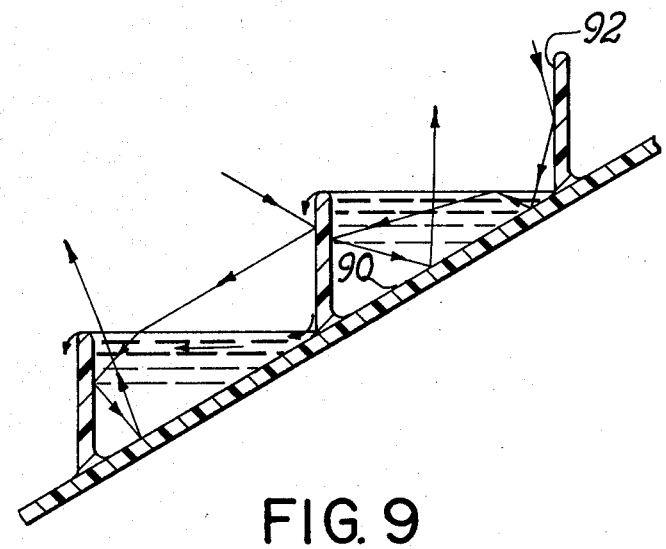
FIG. 9 shows the collecting channel design for use at high latitudes where the slope of the collecting channel collection surface equals the slope of the roof.

When the slope angle A is identical to the slope angle of the surface where the solar heater is mounted, the panel becomes a flat surface 90 with vertical fins 92 as shown in FIG. 9. The heating pool results from the combination of the fins and the backing plate as a single unit which produces a cascade flow. In this embodiment, however, there is no enclosed volume underneath the cascade forming surface for the optional cross flow.

Figure 10:
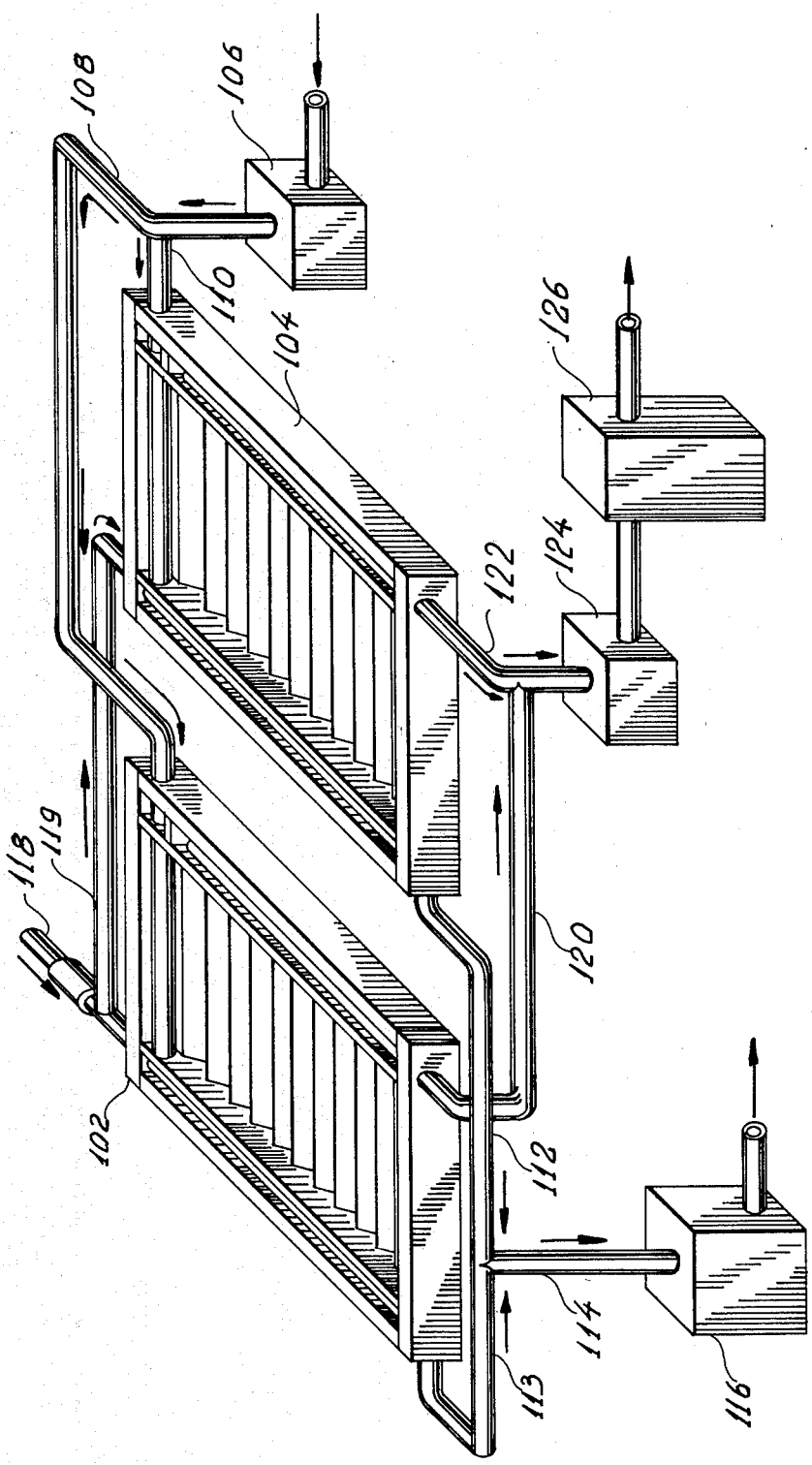
FIG. 10 shows a schematic diagram of a cascade flow system with the optional cross flow system.

A complete cascade flow solar fluid heating system with optional cross flow is shown in FIG. 10. The system is made up of multiple cascade units 102 and 104 which are interconnected. Water or other fluid is introduced through pump and filter 106 into cascade flow feed pipes 108 and 110 which introduce the water at the top of the cascade units 102 and 104 respectively. The heated water or other fluid is collected by output pipes 112 and 113 and flows through collection line 114 to a booster pump 116 from which it is pumped to a swimming pool or other use. The cross flow feed lines 118 and 119 introduce a cross flow into cascade units 102 and 104 respectively. The collection pipe 120 from unit 102 connects with the cross flow output pipe 122 of unit 104 which leads to booster pump 124 going to conventional house water heater 126 or some other house use.

The cross flow, in the spaces between the channel forming surface and the backing plate, is perpendicular to the cascade flow and does not depend on gravity. The cross flow is generated by an impeller pump or by feed line pressure. The radiant energy absorption process occurs mainly on the collecting channel surface which forms the dividing surface between the two flows, so that the energy absorbed by the surface will be transferred to both flows, on each side of the surface, as a function of the differential temperature between the fluids and the temperature of the absorbing surface. If the absorbing surface is partly transparent, then some energy will be transmitted to and absorbed by the backing plate, to heat the cross-flow. The reflective layer 70 and insulating layer 68, shown in FIG. 3, prevent energy loss through the backing plate 66. The partition of energy between the two flows can be adjusted by choice of the absorptivity and transparency of the dividing surface material and by the adjustment of the velocities of the two flows. When one fluid is not circulating, its temperature will increase and its heat content will be transferred to the flowing fluid by thermal conduction through the dividing surface.

Changes and modifications in the specifically described embodiments can be carried out without departing from the scope of the invention which is intended to be limited only by the scope of the appended claims.

What is claimed is:

1. A cascade solar fluid heater which can be mounted on a roof or other structure for direct solar energy heating of a fluid by means of incident radiant energy, comprising:

a plurality of collection channels connected in series to form a continuous cascade or staircase arrangement, the channels being of a highly absorbing material which absorbs a fraction of the incident radiant energy and increases in temperature;

first inlet means for introducing a first fluid at the top of the cascade arrangement to produce a continuous flow of fluid down the cascade, the fluid flow being sufficient for causing the fluid to collect in the collection channels for a sufficient time to be heated by the material forming the channels;

first removal means to remove fluid which has flowed to the bottom of the cascade and been heated in the collection channels;

a backing plate to which the continuous cascade of collection channels is mounted, the backing plate and channels forming a series of enclosed flow spaces underneath the channels running perpendicular to the cascade flow;

second inlet means for introducing a second fluid into the enclosed flow spaces underneath the channels to produce an independent cross-flow of the second fluid underneath the channels to be heated by the material forming the channels; and second removal means to remove fluid which has flowed through the enclosed flow spaces beneath the channels and been heated.

2. The cascade solar heater of claim 1 wherein each collection channel is shaped and oriented to cause radiant energy, incident at an angle of incidence $I_o$, or any lesser angle, where $I_o$ is the angle of incidence determined by the position of the sun at a particular preselected day of the year and time of the day at the geographic latitude where the heater is located, and reflected from each channel to be totally internally reflected at the free surface of the fluid collected in the channel, thereby reflecting the energy back onto the collection channel and increasing absorption.

3. The cascade solar fluid heater of claim 2 wherein each collection channel comprises a sloped collection surface and a rising surface joined together at a junction, the sloped collection surface and the rising surface forming the walls of the channel with the junction forming the bottom, the channels being mounted to the backing plate at the junctions between the sloped collection surfaces and the rising surfaces.

4. The cascade solar fluid heater of claim 3 wherein the sloped collection surface has a slope A determined by $$A = \tfrac{1}{2}[\sin^{-1}(\sin I_o/n_1) + \sin^-(n_o/n_1)]$$

where $I_o$ is a preselected design value for the angle of incidence of the radiant energy onto the heater, $n_o$ is the index of refraction of air, and $n_1$ is the index of refraction of the fluid, whereby all radiant energy that is incident at an angle less than or equal to $I_o$ and is reflected from the sloped collection surface will be totally internally reflected at the free surface of the fluid.

5. The cascade solar heater of claim 1, 2, 3 or 4 further including a removable transparent cover to prevent loss of fluid by evaporation and loss of heat by convection and to produce a greenhouse effect.

* * * * *